United States Patent
Narayanaswami

(10) Patent No.: US 10,534,578 B1
(45) Date of Patent: Jan. 14, 2020

(54) MULTI-INPUT FLOATING-POINT ADDER

(71) Applicant: Google LLC, Mountain View, CA (US)

(72) Inventor: Ravi Narayanaswami, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/113,410

(22) Filed: Aug. 27, 2018

(51) Int. Cl.
*G06F 7/485* (2006.01)
*G06F 7/499* (2006.01)
*G06F 7/509* (2006.01)

(52) U.S. Cl.
CPC .......... *G06F 7/485* (2013.01); *G06F 7/49936* (2013.01); *G06F 7/509* (2013.01)

(58) Field of Classification Search
CPC ................................. G06F 7/485; G06F 7/509
See application file for complete search history.

(56) References Cited

U.S. PATENT DOCUMENTS

| | | | |
|---|---|---|---|
| 4,511,990 A | 4/1985 | Hagiwara et al. | |
| 4,698,711 A | 10/1987 | Mills et al. | |
| 5,257,215 A | 10/1993 | Poon | |
| 5,359,548 A * | 10/1994 | Yoshizawa | G06F 7/485 708/505 |
| 5,487,022 A | 1/1996 | Simpson et al. | |
| 7,392,274 B2 | 6/2008 | Shaw | |
| 8,185,570 B2 | 5/2012 | Fukumura et al. | |
| 8,412,756 B1 * | 4/2013 | Langhammer | G06F 7/5095 708/201 |
| 8,615,542 B2 | 12/2013 | Shaw | |
| 9,495,131 B2 | 11/2016 | Chen et al. | |
| 2003/0154227 A1 | 8/2003 | Howard et al. | |
| 2006/0062467 A1 | 3/2006 | Zou et al. | |
| 2009/0228538 A1 | 9/2009 | Nagano et al. | |
| 2019/0018673 A1 * | 1/2019 | Langhammer | G06F 7/509 |

FOREIGN PATENT DOCUMENTS

CN 107168678 A 9/2017

OTHER PUBLICATIONS

'www.cs.uaf.edu' [online] "Addition and Subtraction," Oct. 20, 1997, [retrieved on Jun. 20, 2018] Retrieved from Internet: URL<https://www.cs.uaf.edu/2000/fall.cs301/motes/Chapter6/node3.html> 3 pages.

(Continued)

*Primary Examiner* — Chuong D Ngo
(74) *Attorney, Agent, or Firm* — Fish & Richardson P.C.

(57) ABSTRACT

Methods, systems, and apparatus, including computer programs encoded on a computer storage medium, for a circuit configured to perform computations using multiple inputs. The circuit includes multiple adder circuits and a selection circuit that includes multiple input selector. Each adder circuit performs an addition operation using sets of inputs derived from the multiple inputs. The input selectors are configured to select one or more inputs from a set of inputs derived from the multiple inputs based on a sign bit for an input in the set and pass the selected inputs to an adder circuit that generates a sum using the selected inputs. The circuit determines a routing of the sum to another adder circuit based in part on a sign bit for the input in the set of inputs.

20 Claims, 4 Drawing Sheets

(56) References Cited

OTHER PUBLICATIONS

Liang et al, "Floating point unit generation and evaluation for FPGAs", Proceedings of the 11th Annual IEEE Symposium on Field-Programmable Custom Computing Machines, Apr. 2003, 10 pages.

PCT International Written Opinion and Search Report in International Application No. PCT/US2019/045418, dated Nov. 4, 2019, 16 pages.

* cited by examiner

MULTI-INPUT FLOATING-POINT ADDER

BACKGROUND

This specification relates to hardware circuits for performing mathematical computations.

Computational circuits can include multiple adder circuits that are used to add numerical inputs such as integers and floating-point numbers. Adder circuits can be expensive to procure and integrate into an existing computing circuit and some adder circuits are not efficiently sized for certain applications. These circuits can consume a substantial area of a circuit die but provide no advantage in computing throughput despite their large size. Adder circuits that are oversized for certain computing applications can cause inefficiencies in power consumption and utilization.

A hardware circuit can be used to implement a neural network. A neural network having multiple layers can be used to compute inferences using a computational circuit that includes multiple adder circuits. Computational circuitry of the hardware circuit can also represent a computation unit that is used to perform neural network computations for a given layer. For example, given an input, the neural network can compute an inference for the input by performing dot product operations using one or more of the multiple adders in a computation unit of the hardware circuit.

SUMMARY

Methods, systems, and apparatus, including computer programs encoded on a computer storage medium, for a circuit configured to perform computations using multiple inputs. The circuit includes multiple adder circuits and multiple input selectors. Each adder circuit performs an addition operation using sets of inputs derived from the multiple inputs. The input selectors are configured to select one or more inputs from a set of inputs derived from the multiple inputs based on a sign bit for an input in the set and pass the selected inputs to an adder circuit that generates a sum using the selected inputs. The circuit determines a routing of the sum to another adder circuit based in part on a sign bit for the input in the set of inputs.

One aspect of the subject matter described in this specification can be embodied in a circuit configured for adding multiple inputs. The circuit includes multiple unsigned adders, each unsigned adder being configured to perform an addition operation using sets of inputs derived from the multiple inputs; and a respective input selector for each unsigned adder. The respective input selector being configured to: select at least two inputs in a first set of inputs derived from the multiple inputs, the at least two inputs being selected based on a sign bit for an input in the first set, wherein the selected at least two inputs in the first set have the same sign; provide the first set of inputs to a corresponding unsigned adder to generate a first sum using the selected at least two inputs in the first set. The circuit further includes a normalized adder configured to: generate a final sum based on one or more sums generated using the multiple unsigned adders that each receive at least two inputs that have the same sign, wherein the final sum corresponds to a sum of the multiple inputs.

These and other implementations can each optionally include one or more of the following features. For example, in some implementations, the normalized adder is further configured to: receive inputs relating to a result of an addition operation performed by one or more unsigned adders of the multiple unsigned adders; and generate the normalized output using the inputs relating to the result of the addition operation by the one or more unsigned adders.

In some implementations, a second input selector is configured to: receive two or more of remaining inputs derived from the multiple inputs and that were not included in the first set of inputs; and provide the two or more remaining inputs to a corresponding second unsigned adder to generate a second sum, where at least two of the two or more remaining inputs are provided based on a respective sign of the two or more remaining inputs. In some implementations, the respective input selector is further configured to: select an input to provide to another unsigned adder and route a remaining input to at least one other unsigned adder.

In some implementations, the sum of the multiple inputs is a normalized result that represents a sum of adding each of the multiple inputs irrespective of the sign of each input in the multiple inputs. In some implementations, each input of the multiple inputs is a floating-point number and a sign bit for each input indicates the sign of the input and identifies a value of the floating-point number as being greater than zero or less than zero.

In some implementations, each of the respective input selectors is configured to: determine, based on a sign bit for an input, whether the input has a numerical value that is greater than zero or less than zero; and select two or more inputs that each have a numerical value that is greater than zero or that each have a numerical value that is less than zero.

In some implementations, each of the respective input selectors is further configured to: communicate with a first input port of a particular unsigned adder; communicate with a second input port of the particular unsigned adder; provide a first input of the selected two or more inputs to the particular unsigned adder using the first input port of the particular unsigned adder; and provide a second input of the selected two or more inputs to the particular unsigned adder using the second input port of the particular unsigned adder.

In some implementations, each of the respective input selectors is further configured to: communicate with a bypass port of the particular unsigned adder; and route, using the bypass port of the particular unsigned adder, a remaining input not included in the selected two or more inputs.

One aspect of the subject matter described in this specification can be embodied in a computer-implemented method for adding multiple inputs using a hardware circuit that includes multiple input selectors and multiple unsigned adders. The method includes, obtaining, by the hardware circuit, multiple inputs, each input having a respective sign; and selecting, by a first input selector, at least two inputs in a first set of inputs from the multiple inputs, the at least two inputs being selected based on a sign bit for an input in the first set. The method includes, providing, by the first input selector, the first set of inputs to a first unsigned adder, wherein the at least two inputs in the first set have the same sign; and generating, by the first unsigned adder, a first sum using the selected at least two inputs and passing a remaining input of the first set that was not included among the selected at least two inputs.

The method includes, receiving, by a second input selector that corresponds to a second unsigned adder, at least two other inputs to generate a second sum using the second unsigned adder, the at least two other inputs being selected from among the first sum and the remaining input, based on a sign of the first sum and a sign of the remaining input; and generating, by a normalized adder, a final sum based on one or more sums generated using the multiple unsigned adders that each receive at least two inputs that have the same sign, wherein the final sum corresponds to a sum of the multiple inputs.

These and other implementations can each optionally include one or more of the following features. For example, in some implementations, the method further includes, generating, using a normalizing adder, a normalized output using at least the first sum and the second sum, wherein the normalized output corresponds to the sum of the multiple inputs.

In some implementations, the method further includes, receiving, by a third input selector, two or more remaining inputs derived from the multiple inputs and that were not included in the first set of inputs; and providing, using the third input selector, the two or more remaining inputs to a third unsigned adder to generate a third sum, where at least two remaining inputs are provided based on a respective sign of the two or more remaining inputs.

In some implementations, the method further includes: determining, based on a sign bit for an input, whether the input has a numerical value that is greater than zero or less than zero; and selecting two or more inputs that each have a numerical value that is greater than zero or that each have a numerical value that is less than zero.

In some implementations, the method further includes: providing, to the first unsigned adder and using a first input port of the first unsigned adder, a first input of the selected two or more inputs; and providing, to the first unsigned adder and using a second input port of the first unsigned adder, a second input of the selected two or more inputs, where the second input has the same sign has the first input.

In some implementations, the sum of the multiple inputs is a normalized result that represents a sum of adding each of the multiple inputs irrespective of the sign of each input in the multiple inputs. In some implementations, each input of the multiple inputs is a floating-point number and a sign bit for each input indicates the sign of the input and identifies a value of the floating-point number as being greater than zero or less than zero.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments to realize one or more of the following advantages. The described techniques can be used to implement a computation unit that can efficiently sum multiple floating-point inputs. The computation unit can form a multi-input floating-point adder circuit that has a hardware configuration based on a cascading structure of input selectors and adders.

The adder circuit described in this specification uses a smaller area of a circuit die to add N inputs than conventional adder circuits that are capable of adding the same number of inputs as the described adder circuit. This is because the multi-input floating-point adder circuit requires only a single normalizing adder to normalize addition results and generate the sum of the multiple inputs, whereas conventional adder circuits can require multiple normalizing adders because inputs are not grouped using the approach described in this document. In particular, because of the described grouping approach, the described adder circuit can include multiple unsigned adders and only a single normalizing adder. Because unsigned adders do not have normalization functionality, the unsigned adders (and, in turn, the overall described circuit) use a smaller area than conventional normalizing adders.

Based on the described techniques, power consumption at the circuit can be also reduced, while computational speed is increased by reducing a size of a normalization component of the circuit. To realize certain efficiencies, the computation unit uses a particular hardware configuration of adders and input selectors to select and add inputs that have the same sign, and route inputs that have a different sign to at least one other adder in the cascading hardware structure.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
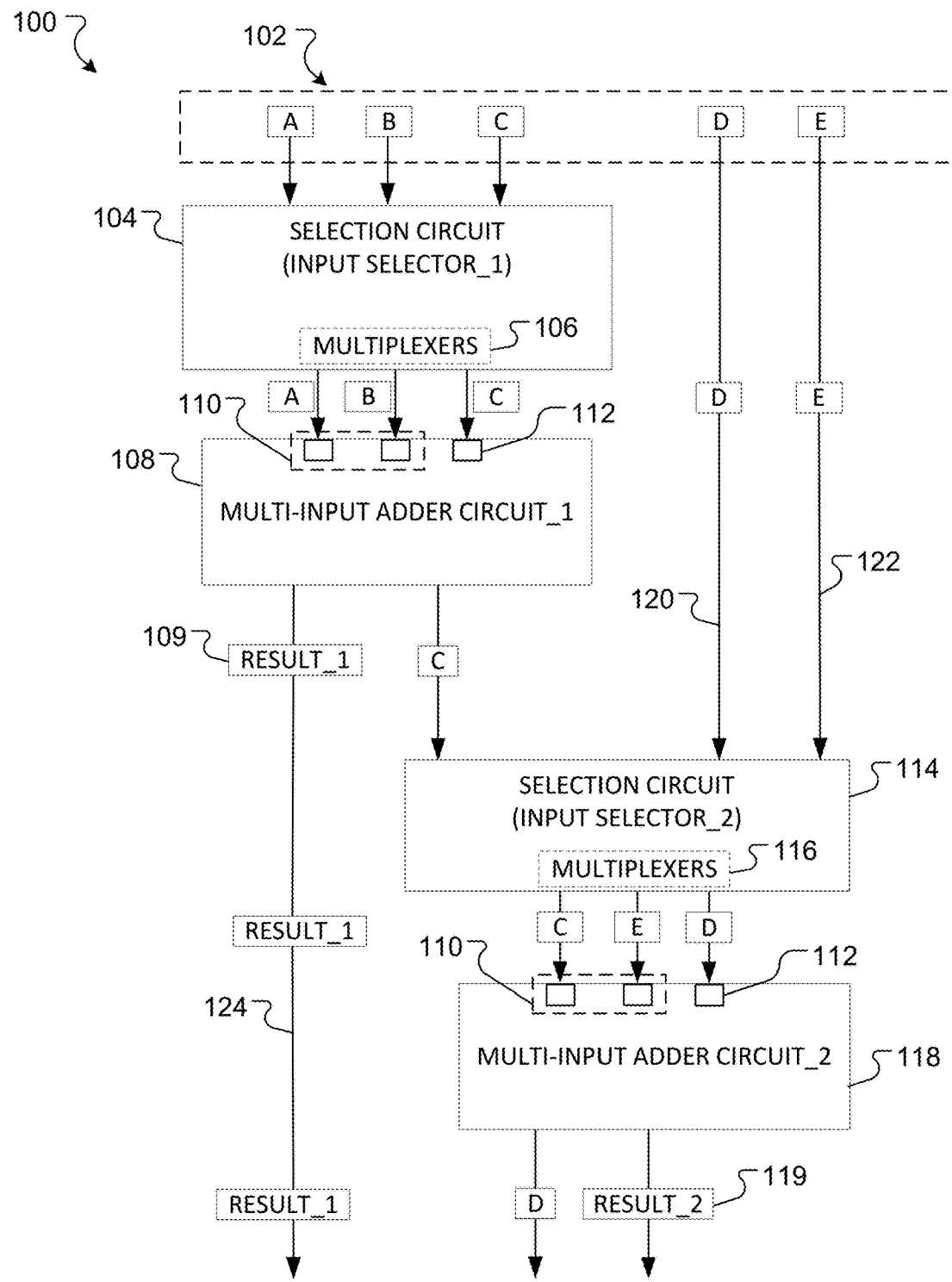
FIG. 1A shows a diagram of an example hardware circuit for performing computations.

In an example implementation, a hardware circuit can be used to implement a multi-layer neural network and perform computations (e.g., neural network computations) by processing the input through each of the layers of the neural network. In particular, individual layers of the neural network can each have a respective set of parameters. Each layer receives an input and processes the input in accordance with the set of parameters for the layer to generate an output based on computations that are performed using one or more adder circuits of an example computation unit. For example, the neural network layer can sum multiple inputs as part of computing a matrix multiplication of an input array by a parameter array or as part of computing a convolution between an input array and a parameter kernel array.

In general, processing an input through a layer of a neural network is accomplished by performing mathematical operations, e.g., multiplication and addition. A hardware circuit can include multiple adder circuits for performing mathematical computations. The adder circuits can be grouped to form a computation unit, e.g., for a matrix or vector processing unit, of the hardware circuit. The computation unit is used to add numerical inputs such as integers and floating-point numbers when the hardware circuit, for example, performs neural network computations associated with processing an input through a layer of a neural network.

This document describes a special-purpose hardware circuit that is configured to add multiple inputs using a technique that groups a subset of the multiple inputs based on a sign bit of each input. The circuit includes at least one selection circuit that, in turn, includes multiple input selectors. Each input selector has one or more multiplexers (muxes). Each multiplexer selects and/or groups inputs based on the sign bit of each input. The circuit also includes multiple individual adders that each include an input port and a bypass port. The input selectors communicate with the adders and pass one or more inputs to the adders using the input port or the bypass port of the adder. The multiple adders are appropriately sized to receive multiple sets of inputs, where each set can include at least two inputs that are added together to generate a result.

The special-purpose circuit can receive multiple inputs from an external source. The inputs can each be numerical inputs (e.g., floating-point numbers or another data type that includes a sign bit), where each input is represented by a data structure of multiple bits. In general, each numerical input, such as a floating-point number, has at least one sign bit in the data structure that indicates whether the number is greater than zero (e.g., is a positive number) or is less than zero (e.g., is a negative number). In some cases, a data structure uses one or multiple zero bits ("0") to indicate a numerical input that is zero. An input selector can select inputs from among the multiple inputs to form a first set of inputs that are passed to an adder using the input port of the adder. The selected inputs each have the same sign bit. For example, the input selector can select two inputs that are both positive floating-point numbers and pass or route these selected inputs to the adder using the input port of the adder. The adder performs an addition operation to add the two inputs and generate a result. In some implementations, for a group of three inputs, an input selector selects two inputs that have the same sign, passes each of the selected two inputs to an adder using a respective input port of the adder, and passes the remaining input to the adder using a bypass port of the adder. In some cases, the remaining input may have the same sign as the selected two inputs or the remaining input may have a sign that is different than the sign of the selected two inputs.

Based on the above design and processing techniques, the special-purpose hardware circuit described in this document can be configured as a multi-input floating-point adder circuit. The multi-input adder circuit can be optimized for processing several sets of inputs by grouping the inputs based on their respective sign bit and using each of the multiple adders to perform addition operation using at least two inputs in a set of inputs. Unlike conventional adder circuits that require larger circuit areas with multiple normalizing adders for adding numbers of different signs, the hardware adder circuit described in this document avoids the need for multiple normalizing adders by adding multiple inputs that have the same sign. Based on the grouping of inputs with the same sign, the circuit can perform these addition operations while using only a single normalizing adder to normalize addition results and generate the sum of the multiple inputs. In this manner, the computational and operational efficiency of the hardware circuit is increased while the area and amount of power consumed by the hardware circuit are reduced relative to existing adder circuits.

FIG. 1A shows an example circuit 100 for grouping inputs to perform mathematical computations. Circuit 100 can include one or more input selectors that are each configured to receive and process multiple inputs 102. Each input 102 is a numerical input that represents a respective operand for a computation. Circuit 100 can also include multiple adder circuits (or adders) that are each configured to receive a set of inputs selected from the multiple inputs 102. As described in more detail below, the adders perform addition operations using at least two inputs in a set of inputs.

Circuit 100 can have at least one normalized adder that generates a final sum by normalizing a result of adding two numbers that have different signs. Normalized adders can require additional circuitry to adjust or normalize a numerical format of certain inputs in order to generate an addition result, particularly when the addition operation involves adding two inputs that have different signs. In some implementations, all but one (e.g., a normalized adder) of the multiple adders at circuit 100 are unsigned adders configured to add inputs that have the same sign. Unsigned adders differ from normalized adders in that they do not need the additional normalization circuitry because they only operate on inputs that have the same sign. In some cases, an unsigned adder assumes a sign that is the same as the sign of at least two inputs that are received by the unsigned adder to compute a sum.

The hardware circuit can include multiple input selectors 104, 114 that each receive a particular quantity of inputs. Each input selector 104, 114 is configured to form a respective set of inputs from the received quantity of inputs. Each input selector is coupled to at least one adder and is configured to pass a set of inputs to the at least one adder. Although two input selectors 104, 114 are shown at FIG. 1, circuit 100 can be configured to include several input selectors (e.g., 5, 20, or 100 input selectors).

Circuit 100 can also have a predefined number of input selectors and adders 108, 118. This predefined number can be based on design requirements of a system that uses circuit 100 to perform certain mathematical operations. As described in more detail below, adders 108, 118 can be respective unsigned adders. In some implementations, circuit 100 can have a portion of circuitry that is dynamically configurable (e.g., in software) to provide one or more additional adders (e.g., unsigned adders) to supplement a predefined number of adders. In other implementations, the number of input selectors 104, 114 and adders 108, 118 at circuit 100 are determined based on a number inputs 102 to be processed using circuit 100.

Each input 102 can be a respective floating-point number, where each input is represented by a data structure of multiple bits, e.g., a 32-bit data word. Each floating-point number has a sign bit in the data structure that indicates whether the number is greater than zero (e.g., is a positive number) or is less than zero (e.g., is a negative number).

The input selectors 104, 114 are configured to select or group at least two numerical inputs that each have the same sign. For example, input selector 104 is configured to identify a sign of at least one input in a set of inputs and select two inputs in the set that each have the same sign. The input selector 104 can identify a sign of a numerical input 102 by analyzing a data structure of bits that represents the numerical input to detect a sign bit of the data structure. A value of the sign bit in this data structure can indicate the sign of the numerical input represented by the data structure. The selected two inputs are provided to adder 108 to generate the sum, e.g., result 109.

In general, each input selector 104, 114 of circuit 100 is configured to identify a quantity of inputs in a set of inputs that each have the same sign. In response to identifying the inputs, the input selector is configured to select the quantity of inputs in the set of inputs that each have the same sign and provide the selected inputs to a particular adder of circuit 100. The adder 108 receives the selected inputs and adds the inputs to generate a result 109 that is sum of the selected inputs. In some implementations, each input selector 104, 114 selects the quantity of inputs in the set of inputs that each have the same sign based on a configuration of the adders 108, 118 of circuit 100.

For example, adder 108 can be a 3-input adder that receives each of two inputs via respective input ports 110 of adder 108 and one input via a bypass port 112 of adder 108. In this context, a set of inputs can include three floating-point numerical inputs. As discussed above, in some cases, the input received using the bypass port 112 of the adder 108 may have the same sign, e.g., is a positive number, as each of the two inputs received using the respective input ports 110. Alternatively, the input received using the bypass port 112 of the adder 108 may have a sign that is different than, e.g., is a negative number, the sign of the two inputs that are received using the respective input ports 110. An input received using a bypass port of an adder is also referred to herein as a remaining input.

Each input selector 104, 114 of circuit 100 can be configured to communicate with two or more input ports (e.g., port 110) of an adder 108, 118 of circuit 100 and a bypass port (e.g., port 112) of the adder 108, 118. Each input selector has one or more muxes and each mux is configured to select inputs based on a sign bit of the inputs. For example, each mux 106, 116 can have a select setting that based on the sign (e.g., positive or negative) of an input and that is used to select and pass a particular input in a set of two inputs. In general, each input selector uses its muxes to select two or more inputs. The input selectors can each select a quantity of inputs based on a configuration of an adder that will receive the selected inputs. For example, when providing inputs to a 3-input adder, the input selector 104 will: i) select a first input and pass it to a first input port 110 of the 3-input adder 108; ii) select a second input and pass it to a second input port 110 of the 3-input adder 108; and iii) select a third input and pass it to a bypass port 112 of the 3-input adder 108.

A respective set of muxes 106, 116 included in the respective input selectors 104, 114 can each include: i) a first 2:1 mux configured to select and pass a numerical value that has a particular sign (e.g., positive), ii) a second 2:1 mux configured to select and pass a numerical value that has a particular sign that is the same as the sign of the input selected by the first 2:1 mux (e.g., positive), and iii) a third 3:1 mux configured to select and pass the remaining numerical value. In some cases, the remaining numerical value has a sign that is the same as, or different than, the sign of the inputs selected using one of the 2:1 muxes.

The first 2:1 mux receives a set of two inputs, identifies a sign of the two numerical inputs in the set, and selects and passes a single numerical input of the set that has a sign matching the particular sign that the first mux is configured or coded to pass. The second 2:1 mux functions in a manner that is substantially similar to the first 2:1 mux. The third 3:1 mux receives a set of three inputs, identifies a sign of the three numerical inputs in the set, and selects and passes a single numerical input of the set that has a sign matching the particular sign that the third mux is configured or coded to pass (or a sign that is different than the sign coded at the first mux or second mux). In this manner, if the first mux is coded to select and pass positive numerical inputs, then the third mux is coded to select and pass negative numerical inputs.

The input selectors use their respective muxes to provide inputs to respective adders of circuit 100. For example, the input selector 104 can route inputs, A and B, to input port 110 of adder 108, where the adder 108 adds the two inputs, A and B, to generate sum represented by result 109. Similarly, the input selector 114 can route inputs, C and E, to input port 110 of adder 118, where the adder 118 adds the two inputs, C and E, to generate a sum represented by result 119. Inputs C, D, and E each correspond to remaining or unselected inputs and are described in more detail below.

In some implementations, result 109, or 119, is provided as an input to another adder (e.g., a third adder of circuit 100) that is downstream from adder 108 or adder 118. For example, a result 109 can be provided downstream as input to another adder using a wired connection 124 (e.g., a hard wired connection) between an output port of a first adder (upstream) and an input port of a second adder (downstream).

Input selector 104 can also route input (C) to bypass port 112 of adder 108. Similarly, input selector 114 can also route input (D) to bypass port 112 of adder 118. In some implementations, bypass ports of the adders 108, 118 are used to route one or more remaining inputs to at least one other adder of circuit 100. Inputs routed via a bypass port of an adder correspond to remaining inputs that were not included in a selected set of two or more inputs provided to input ports of the adders. For example, a remaining input (C) routed via the bypass port of an adder can have a sign (e.g., negative) that is different than the sign of the at least two inputs (e.g., positive) that were provided to the input port of the adder. In other implementations, the remaining input (C) can have the same sign as the at least two inputs.

As described below with reference to FIG. 2, circuit 100 can include an example hierarchy of N number of adders, such that results and remaining inputs that are output by adders upstream in the hierarchy are provided as inputs to adders downstream in the hierarchy. In some implementations, each level in the hierarchy corresponds to a respective stage in an example multi-stage computation used to generate a sum of the multiple inputs 102. For example, in addition to result 109 and input C, inputs D and E of FIG. 1 can also correspond to remaining inputs from a first stage of the computation.

As shown at FIG. 1, inputs D and E are not provided as inputs to an example upstream adder, e.g., based in part on the quantity (5) of inputs 102 included in the multiple inputs 102 and the 3-input configuration of the adders at the first adder stage of circuit 100. In this instance, circuit 100 can include one or more example wired connections 120, 122 to pass one or more unselected or remaining inputs to input selector 114 downstream in the hierarchy. Hence, circuit 100 can be configured to use at least the connections 120, 122 to pass unused numerical inputs from an adder stage upstream to a subsequent adder stage downstream.

For clarity, although the descriptions of components at FIG. 1, and throughout this document, apply to adders configured to receive a particular quantity of inputs (e.g., three inputs). These descriptions are equally applicable to other types of adders, e.g., adders configured to receive more than three inputs.

Figure 1B:
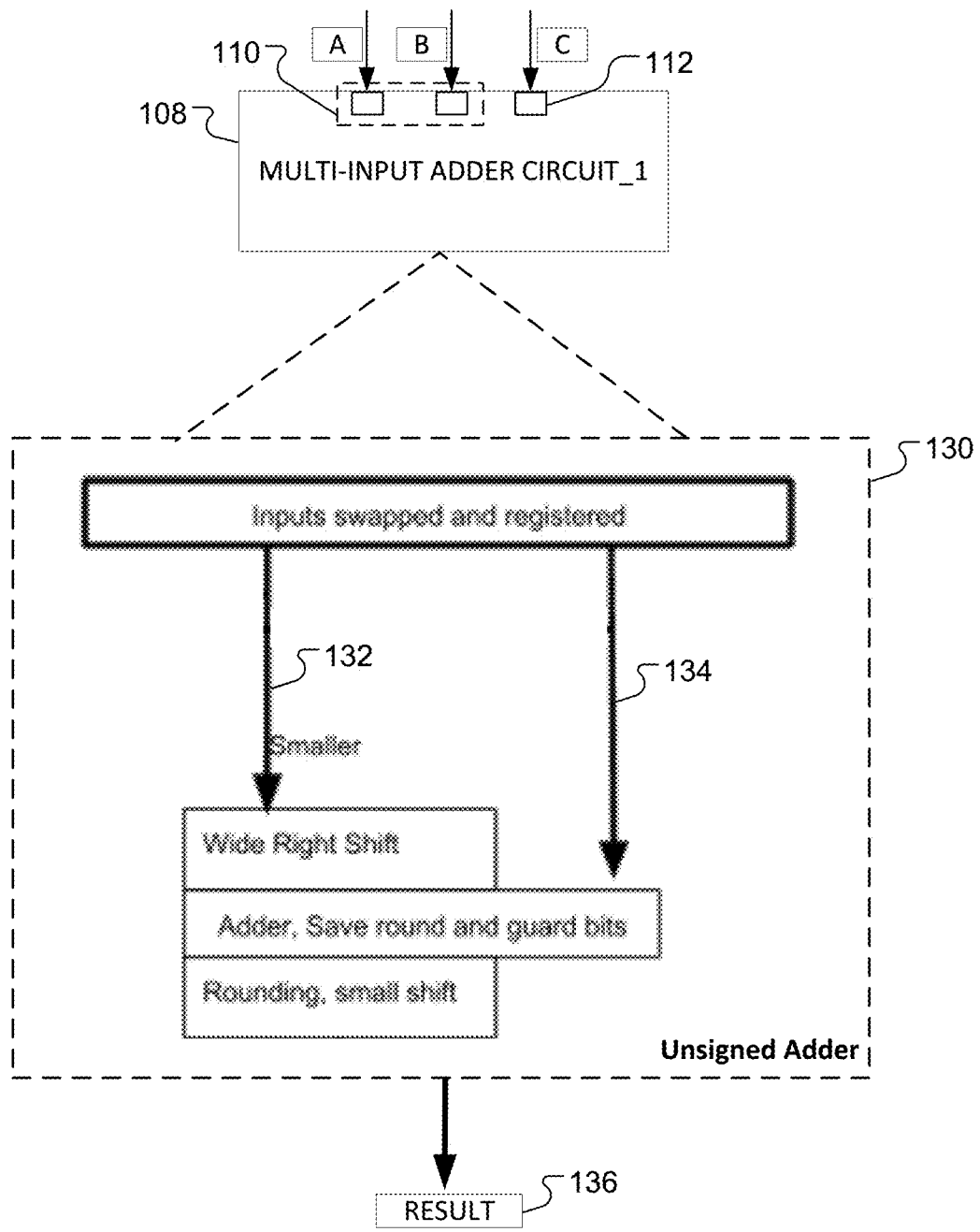
FIG. 1B shows a diagram of an example hardware adder circuit.

FIG. 1B shows a diagram of an example hardware unsigned adder circuit 130. As indicated above, adder 108 (or 118) can be an unsigned adder and circuit 130 can represent components of unsigned adder 108. Circuit 130 is configured to receive and add at least two inputs 132, 134 that have the same sign. For example, the inputs can be two positive floating-point numbers.

As discussed above, unsigned adders differ from normalized adders in that they do not need additional normalization circuitry because they can be configured to only operate on inputs 132, 134 that have the same sign. For example, unsigned adder circuit 130 does not require additional circuit components typically found in normalized adders, such as hardware components for performing twos complement operations, lead zero detect operations, or wide left shift operations that are usually required when an addition operation involves adding two inputs that have different signs. Hence, an adder 108 that includes unsigned adder circuit 130 requires less area on a circuit die and can consume less power than a normalized adder, due to the elimination of the additional normalization circuitry.

Unsigned adder circuit 130 includes adder logic that it uses to add, for example, two positive floating-point numerical inputs 132, 134 and generate a result 136. In general, an example binary data structure for a floating-point number can include a portion of bits that represent a mantissa, an exponent, and a sign of the number. In some cases, one input 132 can have a smaller exponent value than another input 134 and the adder 108 may have to perform a shifting operation to align binary points between the two inputs 132, 134. In this case, to align the binary points, the smaller exponent is incremented and the mantissa is shifted right until the exponents are equal. Once shifted, the circuit 130 uses its adder logic to add the inputs 132, 134, performs any needed operations relating to rounding, small-scale shifting, or appending of guard bits for fractional data values, and generates a result 136.

Figure 2:
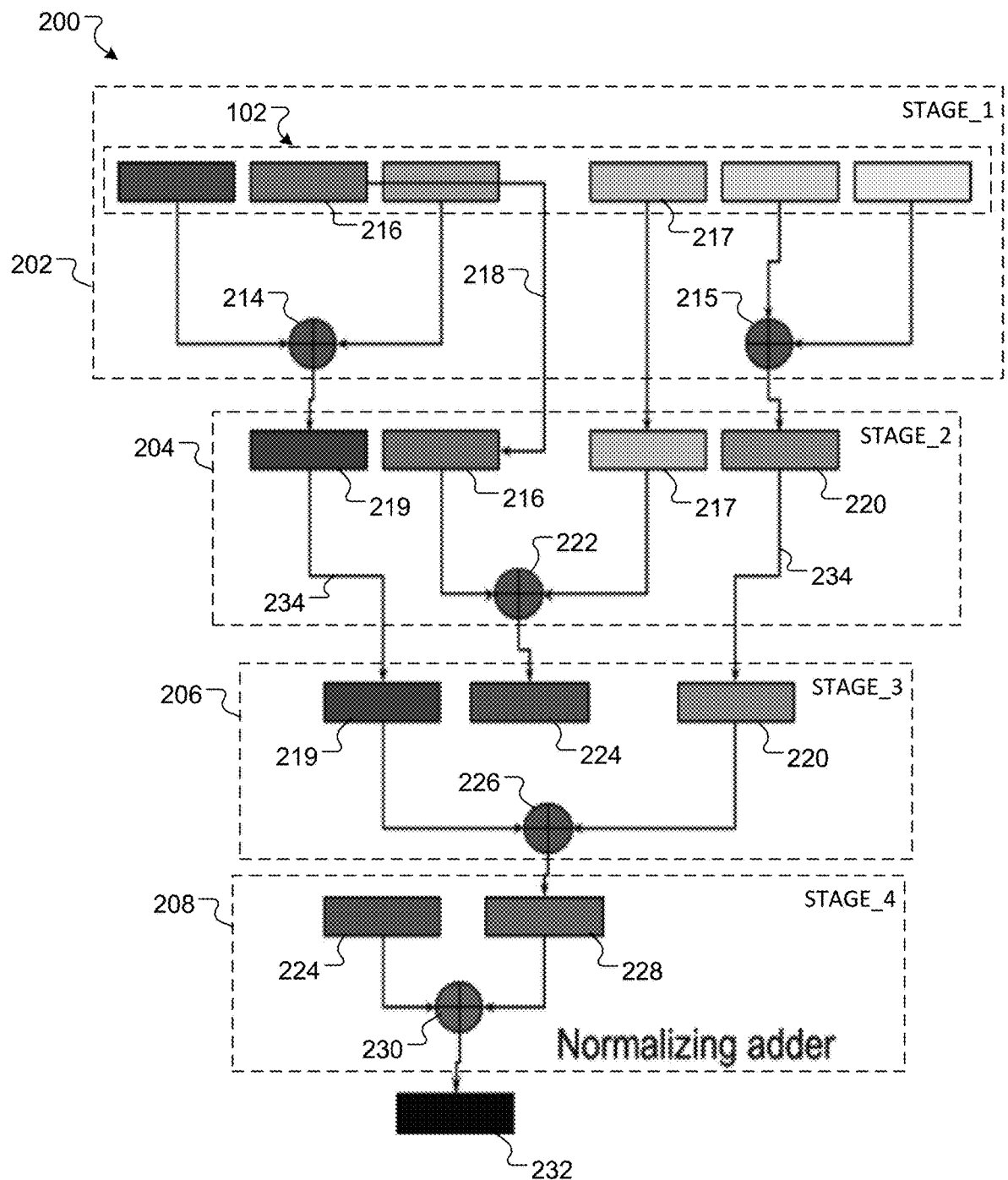
FIG. 2 shows an example arrangement of hardware circuit components used to perform mathematical computations using groups of inputs.

FIG. 2 shows an example hierarchy 200 of components (e.g., input selectors and adders) at hardware circuit 100 that are used to generate a sum of the multiple inputs 102. Circuit 100 can be a multi-input floating-point adder circuit of an example hardware computation unit. The multi-input floating-point adder can be formed using a cascading structure of input selectors and adders. In one implementation, the computation unit is used in a machine learning system that processes inputs using an example neural network, such as a multi-layer neural network that processes inputs (e.g., multiple inputs 102) through each layer of the neural network to compute inferences. For example, the neural network can be included in a hardware computing device, such as a smartphone or set of servers. The hardware device can receive data (e.g., a set of images) and use the neural network to process inputs associated with the data to identify or recognize information (e.g., objects in an image) included in the data.

Hierarchy 200 can include N number of adders, such that results and remaining inputs that are output by adders upstream in the hierarchy 200 are provided as inputs to adders downstream in the hierarchy 200. As shown at FIG. 2, hierarchy 200 can includes multiple levels corresponds to a respective stage in an example multi-stage computation used to generate a sum of the multiple inputs 102.

For example, in a first stage 202 of hierarchy 200, adders 214, 215 each receive a set of 3-inputs. Adder 214 generates a sum 219 using two of the three inputs in the set received by the adder 214. A bypass port of adder 214 routes unused input 216 to a second stage 204 of hierarchy 200. Similarly, adder 215 generates a sum 220 using two of the three inputs in the set received by the adder 215. A bypass port of adder 215 routes unused input 217 to a second stage 204 of hierarchy 200.

In a second stage 204, an adder 222 receives at least two inputs 216, 217. For example, the inputs 216, 217 can correspond to remaining inputs that are routed downstream, e.g., using a respective by pass port of adders 214, 215 upstream, in hierarchy 200 for use at a subsequent stage in an example computation. In some implementations, adder 222 is a 3-input adder that receives at least two inputs 216, 217 that have the same sign and generates a sum 224 using the at least two inputs. Adder 222 can also use a bypass port to route a third input 219 or 220 downstream to subsequent stage in hierarchy 200. In second stage 204, the third input 219 or 220 can be the result of an addition operation performed using an adder upstream in the hierarchy 200. In some cases, the third input 219 or 220 is routed downstream to subsequent stage 206 using an example wired connection 234.

In a third stage 206, an adder 226 receives a set of three inputs 219, 220, 224. In third stage 206, the input 219 can be a respective first sum generated by a first adder upstream in hierarchy 200, while the input 220 can be a respective second sum generated by a second adder upstream in hierarchy 200. Circuit 100 can provide an instruction or command to adder 226 to add inputs 219 and 220 based on an input selector that communicates with adder 226 having identified that inputs 219 and 220 have the same sign. A bypass port of adder 226 routes input 224 to a subsequent stage of hierarchy 200.

In a fourth stage 208, an adder 230 receives at least two inputs 224, 228. The input 224 can be a respective sum generated by an adder upstream in hierarchy 200, but that was unused at the stage that immediately precedes stage 208, while the input 228 can be a respective sum generated by an adder at the stage that immediately precedes stage 208. Hence, input 224, 228 may not have the same sign. In this context, adder 230 can be configured as a normalizing adder that generates a normalized result 232. Using the hierarchy 200, circuit 100 can be configured to generate a sum of the multiple inputs 102 based on a normalized result that represents a sum of adding each of the multiple inputs 102 irrespective of the sign of each input in the multiple inputs.

In some implementations, circuit 100 can receive N inputs and is configured to group the N inputs into floor(N/3) sets and determine some number of remaining inputs that may form a last (or remainder) set of inputs. In some cases, the remaining inputs of the last set are passed downstream, e.g., from one stage to a subsequent stage, of hierarchy 200 using a wired connection of the circuit 100. Circuit 100 can be configured such that, at every stage or any given stage, the circuit will have a particular number of adders that is based on N inputs [floor(N/3) adders] and a particular number of outputs based on the N inputs [2*floor(N/3)+Mod(N/3) outputs], where N corresponds to the number of inputs that are received for adding in a particular stage. In some implementations, every stage in an example hierarchy 200 reduces the number of outputs by a ratio of 3:2.

Figure 3:
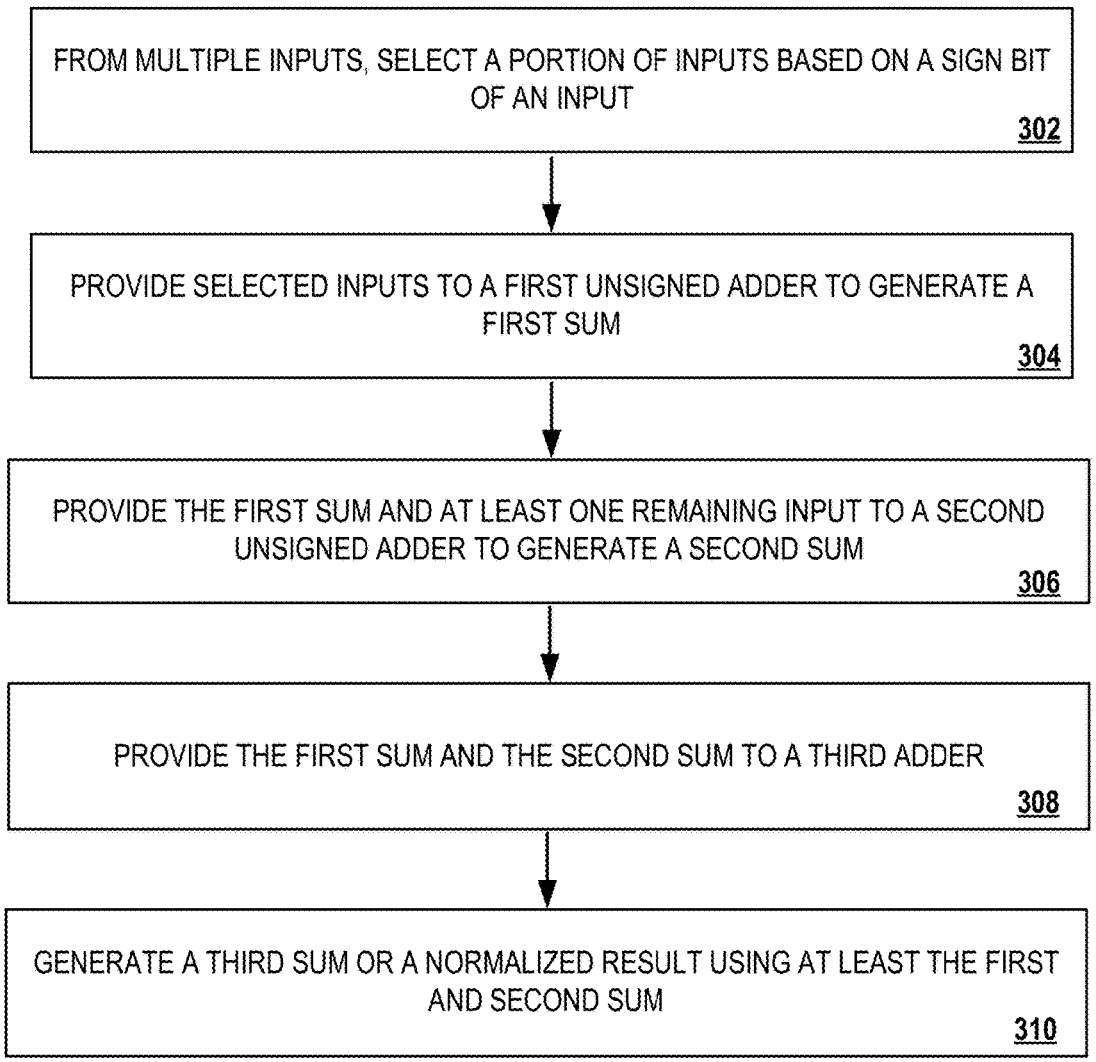
FIG. 3 shows a flowchart of an example process for performing mathematical computations using groups of inputs.

FIG. 3 shows a flowchart of an example process 300 for performing mathematical computations using groups of inputs. Process 300 can be performed using circuit 100 including other devices and systems described in this document.

Referring now to process 300, circuit 100 obtains multiples inputs (302). For example, a selection circuit of circuit 100 obtains or receives multiple inputs from an external source, such as a host device or an external controller. In some implementations, each of the received inputs are respective floating-point numbers and each input has a respective sign that is associated with the number. The sign of each input indicates whether the input has a floating-point numerical value that is greater than zero (is a positive number) or has a floating-point numerical value that is less than zero (is a negative number).

A first input selector of the selection circuit receives a first set of inputs that are formed from the multiple inputs 102 and provides a certain quantity of selected inputs to a first adder of the hardware circuit (304). More particularly, the input selector 104 provides at least two inputs (e.g., inputs A & B of FIG. 1) to the adder 108 to generate a first sum that corresponds to a result 109. In some implementations, the at least two inputs are selected from the first set of inputs formed from the multiple inputs 102. The input selector 104 selects the at least two inputs based on the respective sign of each input in the first set of inputs. The selected two inputs are provided to adder 108 to generate the first sum (e.g., result 109 of FIG. 1).

A second input selector of the selection circuit receives two or more inputs. The received two or more inputs can include the first sum generated by the first adder, one or more remaining inputs of the multiple inputs 102 that were not included in the first set of inputs, or a combination of each. The second input selector then provides at least two other inputs to a second adder to generate a second sum using the second adder (306). For example, input selector 114 can receive remaining inputs C, D, and E of FIG. 1 and select at least two of these inputs based on a sign of each input.

To identify a sign of each input, the input selector 114 can analyze information about each of the received two or more inputs, such as the data structure that represents each input. The input selector 114 then selects at least two inputs that have the same sign based on the identified sign of each input and provides the at least two inputs to adder 118 to generate a second sum that corresponds to result 119.

Circuit 100 is configured to provide two or more inputs to a third adder. For example, the circuit 100 can be configured to provide at least the first sum and the second sum to at least a third adder (308). In some implementations, the circuit 100 provides one or more inputs that are unselected or unused inputs and that are passed downstream using a wired connection of the circuit or a bypass port of an adder located upstream of the third adder. In some cases, the third adder is a normalizing adder configured to generate a normalized output using at least the first sum and the second sum. The normalized output can correspond to a sum of the multiple inputs Circuit 100 is configured to generate a sum of the multiple inputs 102 at least by adding the first sum and the second sum (310). For example, circuit 100 can generate the sum using at least an example normalizing adder located at a stage that downstream in the hierarchy 200. The normalizing adder is configured to receive inputs that correspond to a result of addition operations performed by one or more adders that are upstream of the normalizing adder (or that routed downstream as unused inputs). The normalizing adder generates the sum as a normalized output using the received inputs that correspond to the addition or routing operations performed by the upstream adders.

A number of embodiments have been described. Nevertheless, it will be understood that various modifications may be made without departing from the scope of the invention. For example, various forms of the flows shown above may be used, with steps re-ordered, added, or removed. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A circuit configured for adding multiple inputs, the circuit comprising:
   a plurality of unsigned adders, each unsigned adder being configured to perform an addition operation using sets of inputs derived from the multiple inputs;
   a respective input selector for each unsigned adder, the respective input selector being configured to:
   select at least two inputs in a first set of inputs derived from the multiple inputs, the at least two inputs being selected based on a sign bit for an input in the first set, wherein the selected at least two inputs in the first set have the same sign;
   provide the first set of inputs to a corresponding unsigned adder to generate a first sum using the selected at least two inputs in the first set; and
   a normalized adder configured to:
   generate a final sum based on one or more sums generated using the plurality of unsigned adders that each receive at least two inputs that have the same sign, wherein the final sum corresponds to a sum of the multiple inputs.

2. The circuit of claim 1, wherein the normalized adder is further configured to:
   receive inputs relating to a result of an addition operation performed by one or more unsigned adders of the plurality of unsigned adders; and
   generate the normalized output using the inputs relating to the result of the addition operation by the one or more unsigned adders.

3. The circuit of claim 1, wherein a second input selector is configured to:

receive two or more of remaining inputs derived from the multiple inputs and that were not included in the first set of inputs; and provide the two or more remaining inputs to a corresponding second unsigned adder to generate a second sum, where at least two of the two or more remaining inputs are provided based on a respective sign of the two or more remaining inputs.

4. The circuit of claim 1, wherein the respective input selector is further configured to:

select an input to provide to another unsigned adder and route a remaining input to at least one other unsigned adder.

5. The circuit of claim 1, wherein the sum of the multiple inputs is a normalized result that represents a sum of adding each of the multiple inputs irrespective of the sign of each input in the multiple inputs.

6. The circuit of claim 1, wherein each input of the multiple inputs is a floating-point number and a sign bit for each input indicates the sign of the input and identifies a value of the floating-point number as being greater than zero or less than zero.

7. The circuit of claim 6, wherein each of the respective input selectors is configured to:

determine, based on a sign bit for an input, whether the input has a numerical value that is greater than zero or less than zero; and select two or more inputs that each have a numerical value that is greater than zero or that each have a numerical value that is less than zero.

8. The circuit of claim 7, wherein each of the respective input selectors is further configured to:

communicate with a first input port of a particular unsigned adder;

communicate with a second input port of the particular unsigned adder;

provide a first input of the selected two or more inputs to the particular unsigned adder using the first input port of the particular unsigned adder; and provide a second input of the selected two or more inputs to the particular unsigned adder using the second input port of the particular unsigned adder.

9. The circuit of claim 8, wherein each of the respective input selectors is further configured to:

communicate with a bypass port of the particular unsigned adder; and route, using the bypass port of the particular unsigned adder, a remaining input not included in the selected two or more inputs.

10. A computer-implemented method for adding multiple inputs using a hardware circuit that includes multiple input selectors and multiple unsigned adders, the method comprising:

obtaining, by the hardware circuit, multiple inputs, each input having a respective sign;

selecting, by a first input selector, at least two inputs in a first set of inputs from the multiple inputs, the at least two inputs being selected based on a sign bit for an input in the first set;

providing, by the first input selector, the first set of inputs to a first unsigned adder, wherein the at least two inputs in the first set have the same sign;

generating, by the first unsigned adder, a first sum using the selected at least two inputs and passing a remaining input of the first set that was not included among the selected at least two inputs;

receiving, by a second input selector that corresponds to a second unsigned adder, at least two other inputs to generate a second sum using the second unsigned adder, the at least two other inputs being selected from among the first sum and the remaining input, based on a sign of the first sum and a sign of the remaining input; and generating, by a normalized adder, a final sum based on one or more sums generated using the plurality of unsigned adders that each receive at least two inputs that have the same sign, wherein the final sum corresponds to a sum of the multiple inputs.

11. The method of claim 10, further comprising:

generating, using a normalizing adder, a normalized output using at least the first sum and the second sum, wherein the normalized output corresponds to the sum of the multiple inputs.

12. The method of claim 10, further comprising:

receiving, by a third input selector, two or more remaining inputs derived from the multiple inputs and that were not included in the first set of inputs; and providing, using the third input selector, the two or more remaining inputs to a third unsigned adder to generate a third sum, where at least two remaining inputs are provided based on a respective sign of the two or more remaining inputs.

13. The method of claim 10, further comprising:

determining, based on a sign bit for an input, whether the input has a numerical value that is greater than zero or less than zero; and selecting two or more inputs that each have a numerical value that is greater than zero or that each have a numerical value that is less than zero.

14. The method of claim 13, further comprising:

providing, to the first unsigned adder and using a first input port of the first unsigned adder, a first input of the selected two or more inputs; and providing, to the first unsigned adder and using a second input port of the first unsigned adder, a second input of the selected two or more inputs, where the second input has the same sign has the first input.

15. The method of claim 10, wherein the sum of the multiple inputs is a normalized result that represents a sum of adding each of the multiple inputs irrespective of the sign of each input in the multiple inputs.

16. The method of claim 10, wherein each input of the multiple inputs is a floating-point number and a sign bit for each input indicates the sign of the input and identifies a value of the floating-point number as being greater than zero or less than zero.

17. One or more non-transitory machine-readable storage devices for storing instructions that are executable by one or more processing devices to cause performance of operations comprising:

obtaining, by the hardware circuit, multiple inputs, each input having a respective sign;

selecting, by a first input selector, at least two inputs in a first set of inputs from the multiple inputs, the at least two inputs being selected based on a sign bit for an input in the first set;

providing, by the first input selector, the first set of inputs to a first unsigned adder, wherein the at least two inputs in the first set have the same sign;

generating, by the first unsigned adder, a first sum using the selected at least two inputs and passing a remaining input of the first set that was not included among the selected at least two inputs;

receiving, by a second input selector that corresponds to a second unsigned adder, at least two other inputs to generate a second sum using the second unsigned adder, the at least two other inputs being selected from among the first sum and the remaining input, based on a sign of the first sum and a sign of the remaining input; and generating, by a normalized adder, a final sum based on one or more sums generated using the plurality of unsigned adders that each receive at least two inputs that have the same sign, wherein the final sum corresponds to a sum of the multiple inputs.

18. The machine-readable storage devices of claim 17, wherein the operations further comprise:

generating, using a normalizing adder, a normalized output using at least the first sum and the second sum, wherein the normalized output corresponds to the sum of the multiple inputs.

19. The machine-readable storage devices of claim 17, wherein the operations further comprise:

receiving, by a third input selector, two or more remaining inputs derived from the multiple inputs and that were not included in the first set of inputs; and providing, using the third input selector, the two or more remaining inputs to a third unsigned adder to generate a third sum, where at least two remaining inputs are provided based on a respective sign of the two or more remaining inputs.

20. The machine-readable storage devices of claim 17, wherein the operations further comprise:

determining, based on a sign bit for an input, whether the input has a numerical value that is greater than zero or less than zero; and selecting two or more inputs that each have a numerical value that is greater than zero or that each have a numerical value that is less than zero.

* * * * *